United States Patent [19] [11] 4,052,245
Kuts [45] Oct. 4, 1977

[54] CENTERING DEVICE
[75] Inventor: Mathew Kuts, Akron, Ohio
[73] Assignee: The BF Goodrich Company, Akron, Ohio
[21] Appl. No.: 619,686
[22] Filed: Oct. 3, 1975
[51] Int. Cl.² ............... B29H 17/10; B29H 17/28
[52] U.S. Cl. ................ 156/405 R; 156/133; 226/198
[58] Field of Search ............ 156/96, 123 R, 128 R, 156/128 I, 133, 394 R, 405, 406; 242/157 R; 226/3, 17, 55, 74, 76, 189–192, 196, 198, 199

[56] References Cited
U.S. PATENT DOCUMENTS

| | | | |
|---|---|---|---|
| 1,266,364 | 5/1918 | Wheeler | 156/405 |
| 1,665,831 | 4/1928 | Williams | 156/405 |
| 1,738,503 | 12/1929 | Stevens | 156/405 |
| 1,784,321 | 12/1930 | Tidblad | 226/198 |
| 3,071,032 | 1/1963 | Teplitz | 226/199 |
| 3,537,936 | 11/1970 | Leblond | 156/405 |
| 3,647,126 | 3/1972 | Dieterich | 156/405 |
| 3,654,828 | 4/1972 | Leblond et al. | 156/405 UX |
| 3,713,948 | 1/1973 | Kluger | 156/354 |
| 3,770,178 | 11/1973 | Olah | 226/198 |
| 3,904,471 | 9/1975 | Kubinski | 156/123 |

Primary Examiner—Charles E. Van Horn
Assistant Examiner—John E. Kittle
Attorney, Agent, or Firm—Joseph Januszkiewicz

[57] ABSTRACT

A fabric delivering device which has a fabric supplying roll cooperative with a feeding device which delivers fabric strip material to a tire building drum with the centerline of the fabric aligned with the vertical median centerline of the drum. A centering device cooperates with the feeding device to center the fabric which is picked up by a plurality of spaced pins that retain the orientation of the fabric material as it is fed to the tire building drum.

6 Claims, 11 Drawing Figures

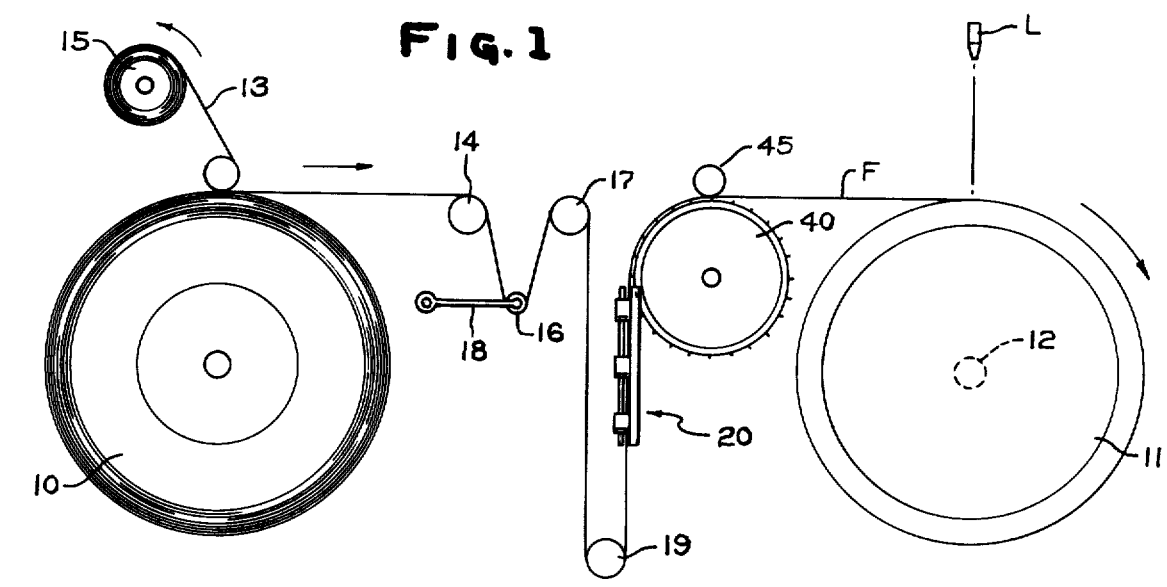
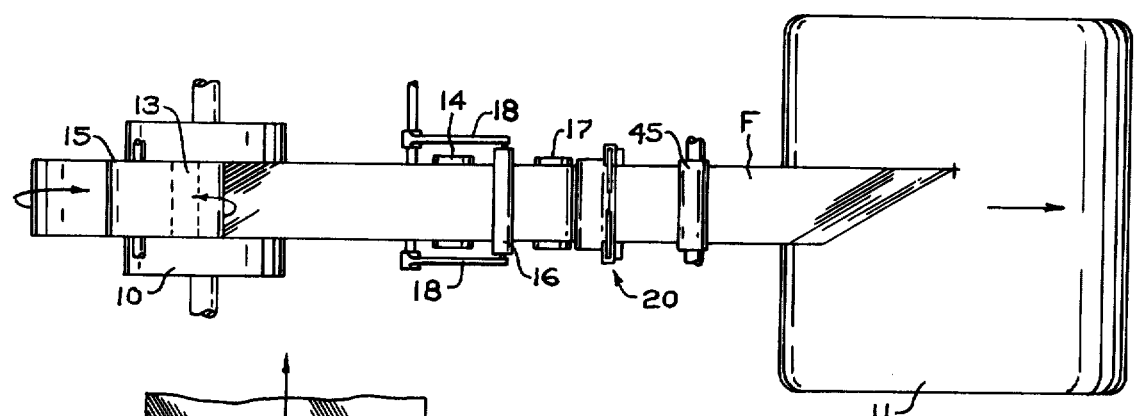
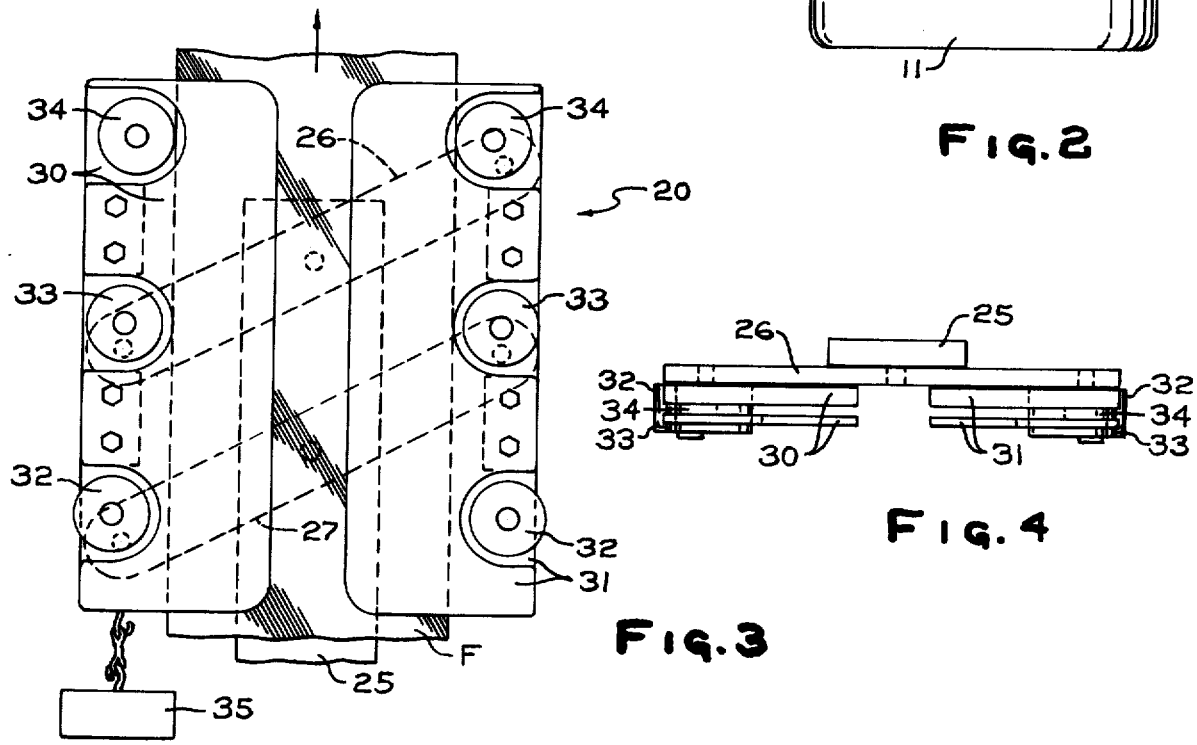

CENTERING DEVICE

BACKGROUND OF THE INVENTION

This invention relates to servicers for tire building machines and more particularly to a device which automatically center and maintains constant tension on fabric delivered to a tire building machine.

Fabric used in tire building may be composed of bias cut pieces joined end to end to form strips that are fed to the tire building machine for use as belts or as strip material in building tire carcasses. It is very important in feeding narrow strip fabric material be they breakers, chaffer strips or belts to avoid the application of tension or uneven pull during their delivery to and application to the tire carcasses. Uneven stretching or tension increases the space between the cords and can result in a dynamically unbalanced tire. Further, it is necessary that the centerline of the strip of material be accurately fed and applied to the carcass.

The present invention provides means for automatically centering the strip of material as it is fed and applied directly onto the tire building drum while simultaneously maintaining a controlled tension on the material as it is being fed to the carcass.

SUMMARY OF THE INVENTION

The present invention contemplates an apparatus for supplying strip fabric material to a tire building drum via an automatic centering device which includes spaced moveable side guide means which apply equal bias to the material to center the material as it is fed onto a feed means which includes a chain and a plurality of pins or needles which captively engage the fabric material to maintain an equal tension on the fabric while centering the centerline of the strip material with the median centerline of the tire building drum.

BRIEF DESCRIPTION OF THE DRAWINGS

FIG. 1 is a schematic side elevational view of the fabric delivering device for servicing a tire building drum.

FIG. 2 is a schematic plan view of the fabric delivering device shown in FIG. 1.

FIG. 3 is an enlarged front elevational view of the fabric centering device.

FIG. 4 is an enlarged plan view of the fabric centering device shown in FIG. 3.

DETAILED DESCRIPTION

Figure 5:
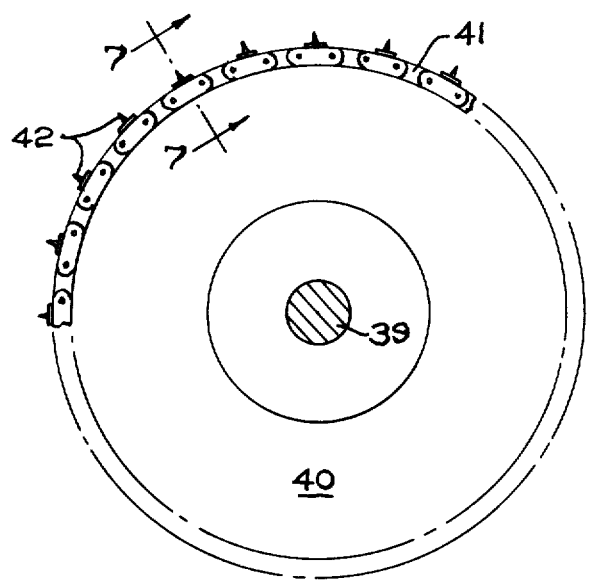
FIG. 5 is an enlarged fragmentary view of the sprocket with a portion of the chain shown with needles thereon.
Figure 6:
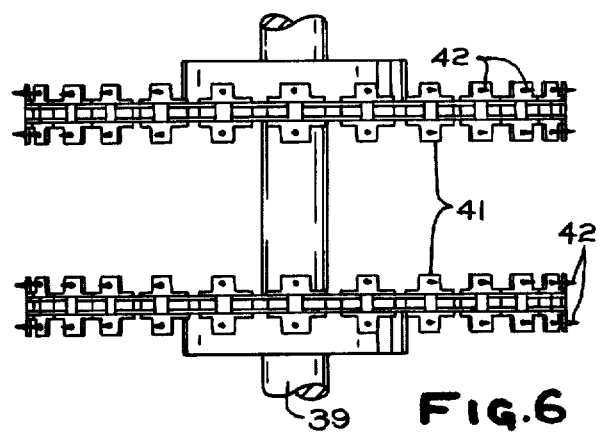
FIG. 6 is a plan view of the pair of sprockets and sprocket chain.
Figure 7:
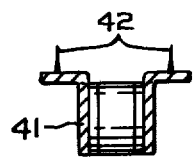
FIG. 7 is a cross sectional view taken of one of the chain links on line 7—7 of FIG. 5 showing the needles outwardly projecting therefrom.

Referring to the drawings wherein like references designate like or corresponding parts throughout several views, there is shown in FIG. 1 a fabric delivery device with a roll supply means 10 suitably supported on support means not shown. A tire building drum 11 suitably journaled on axle 12 is supported for rotation to receive fabric from the roll supply means 10 in a manner to be described. An idler roller 14 mounted closely adjacent to the roll supply means 10 directs the fabric or strip material outwardly away from the roll supply means 10 as a liner material 13 is pulled onto a take-up roll 15 while the strip material is directed to a danser roll 16 and then upwardly to a second idler roll 17. Danser roll 16 is suitably guided for movement in guide means not shown, such that the position of a lever arm 18 connected to the danser roll 16 is operative to control a plurality of limited switches which in turn control the energization and de-energization of a motor which controls the rotation of the liner take-up roller 15 which in turn controls the let-off of the fabric or strip material from the supply roll 10. The operation of the motor for the take-up roller 15 is such as to maintain a suitable supply of strip material in an untensioned condition for passage from idler roller 17 to another roller 19 for passage to a centering device 20.

The centering device or centering means 20 comprises a support bar 25 which is suitably attached to the support means. Support bar 25 pivotally supports a pair of spaced support arms or levers 26 and 27 which in turn have their outermost end portions pivotally connected to a pair of parallel support bars 30—30 and 31—31 (FIG. 4). The respective pairs of parallel support bars have an aperture or passageway therebetween for the passage of the fabric or strip material therethrough which is designated F in FIG. 3. The respective support bars 30 and 31 have journaled thereon a plurality of centering rolls 32, 33 and 34. One of the support arms 30 has a counter weight 35 secured thereto for biasing the respective support bars towards each other which thereby maintain the tension on the support bars for the respective guide rollers 32, 33 and 34 as they engage the side portions of the fabric material F, the centering such fabric material as it passes through the centering device 20. The diameter of the respective guide rolls 32, 33 and 34 increases in diameter progressively such that the lower guide rollers 32 come into contact with the fabric material when it is off center, but it is substantially the respective guide rollers 34—34 which maintain full contact with the fabric material and centers the centerline of the fabric material with the vertical median plan of the tire building drum 11.

Mounted closely adjacent to the centering device 20 are a pair of laterally spaced sprockets 40—40 journaled on shaft 39 which sprockets 40—40 have sprocket chains 41—41 journaled thereon for rotation therewith. The respective sprocket chains 41—41 have outwardly extending projections, pins or needles 42 suitably secured thereto which projections engage the fabric or strip material F as it is led off the centering device 20 such that the respective needles 42 engage the fabric material and carries such fabric material therewith to maintain the alignment of the fabric material with the tire building drum. As shown in FIG. 1, an idler roller 45 is mounted above the sprocket chain 41 to assure a smooth pick-up of the fabric material by the sprocket chain. The size of the sprocket wheels 40 may be smaller than that shown in diagramatic sketch in FIG. 1 to facilitate the pickup of the fabric material and movement thereof onto the tire building drum. The sprockets and sprocket chains 41 act as a carrier means to captively engage and transport the aligned fabric material to the tire carcass being built on the tire building drum 11.

In the operation of the apparatus described, the strip or fabric material and liner is led off from roll supply means 10 with the liner directed upwardly for wind up on the take-up roll 15 while the fabric material F is directed towards the centering means 20, past rollers 14, 17 and 19 as well as past danser roll 16. Danser roll 16 is operative to control the energization and de-energization of a motor which controls the rotation of the liner take-up roller 15 which in turn maintains a suitable supply of fabric material in an untensioned condition for passage to the centering means 20. The centering device or centering means 20 receives the fabric material F between the plurality of centering rollers 32—32, 33—33, and 34—34 which exerts a biasing action on the respective side portions of the fabric material to align the longitudinal centerline of the fabric with the vertical median plane of the tire building drum. As the fabric material is led off from the centering means 20, it is captively picked up immediately by a carrier means which includes a pair of laterally spaced sprocket chains 41—41 with needles 42 thereon, the fabric material is maintained in its centered and aligned position with the plurality of needles maintaining an equal tension on all the guided fabric material so that as the fabric material is delivered to the tire building drum the spacing between the cores is consistent throughout and the fabric material is delivered to the tire building drum in an untensioned condition.

Figure 9:
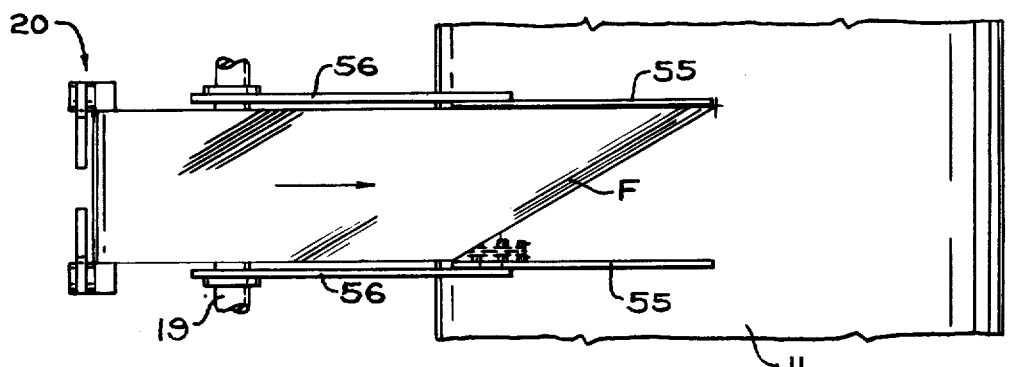
FIG. 9 is a plan view of the modification shown in FIG. 8.
Figure 8:
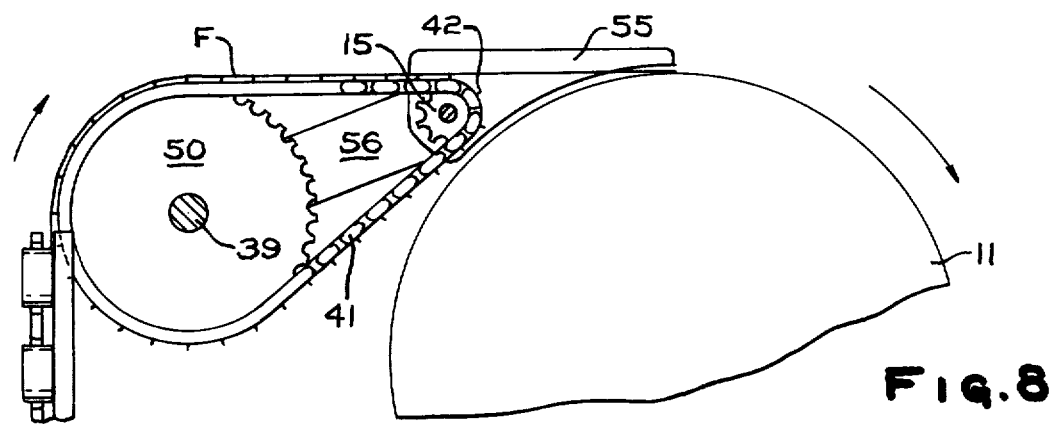
FIG. 8 is a modification of the feed means disclosing a pair of sprockets with a chain trained thereabout.

A modification of the feed means from the centering device to the tire building drum is shown in FIG. 8 and 9, wherein pairs of sprockets 50—50 and 51—51 are longitudinally spaced so that the smaller pair of sprockets 51 will be mounted closely adjacent to the peripheral surface of the tire building drum 11. As in the original embodiment a sprocket chain 41 is trained about the respective pairs of sprockets 50-51 with needles 42 suitably mounted therein which needles engage the fabric material and carries such fabric material towards the tire building drum in an untensioned condition and maintaining alignment of the longitudinally centerline of the fabric material with the vertical median plane of the tire building drum. Laterally spaced guide members 55—55 may be mounted on the shaft 39 via bracket 56 which facilitate the guiding of the fabric material onto the tire building drum.

Figure 10:
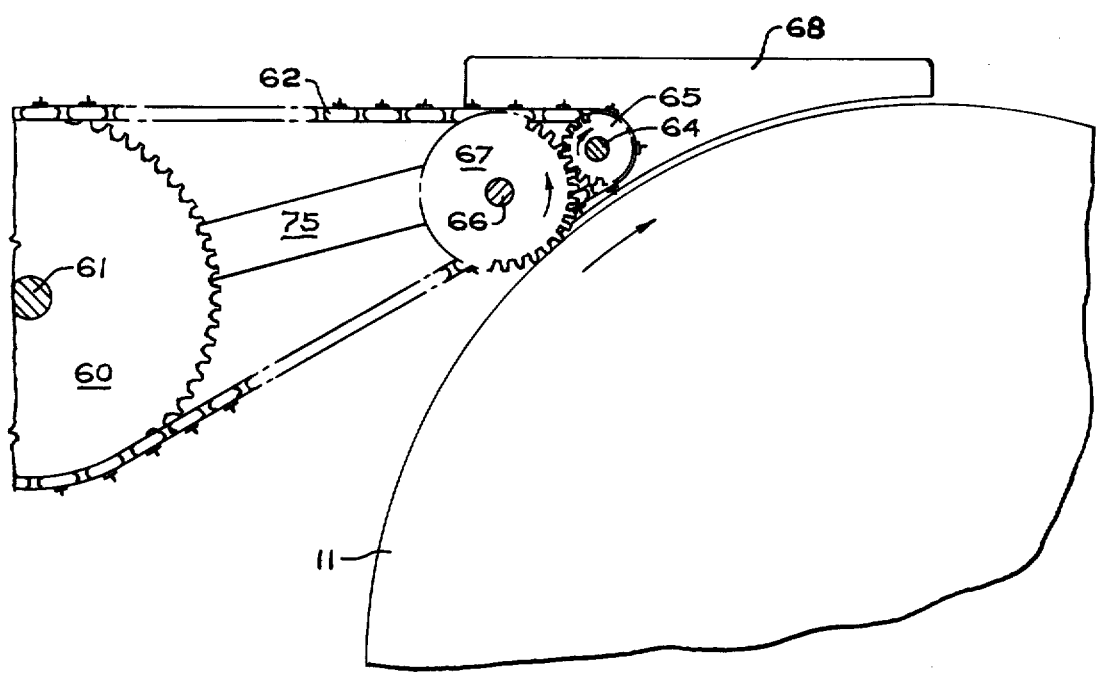
FIG. 10 is a further modification of the feed means disclosing a side elevational view with a portion broken away of a drive means for the sprocket chain.
Figure 11:
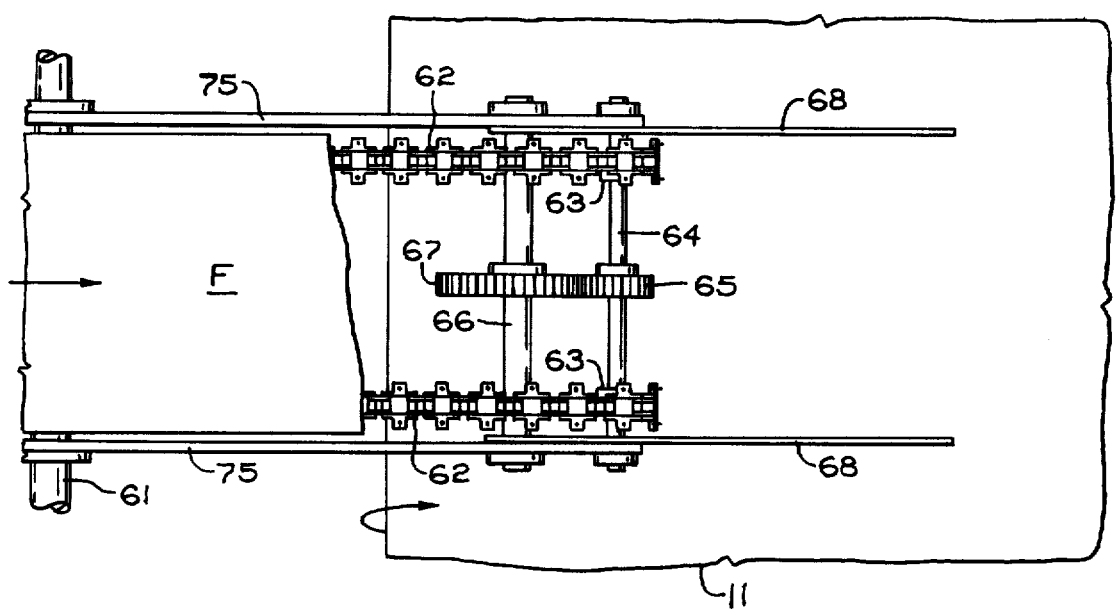
FIG. 11 is a plan view of the modified form of the feed means shown in FIG. 10.

A further modification of the feed and centering means is shown in FIGS. 10 and 11, wherein a pair of sprockets 60 mounted on shaft 61 have trained about them sprocket chains 62 which are also trained about a pair of sprockets 63. Sprockets 63 are keyed to a shaft 64 which in turn has a spur gear 65 (FIG. 11) keyed thereto. Shaft 64 is journaled for rotation on a bracket 75 that is suitably journaled on shaft 61 to permit pivotal movement thereof about shaft 61, which in turn is suitably connected to the support means for the centering device. Journaled for rotation on bracket 75 is a shaft 66, which shaft 66 is parallel to shaft 64. Keyed to shaft 66 is a spur gear 67 which meshes with gear 65. Gear 67 is in rolling contact with the periphery of tire building drum 11 and as the carcass is built up about such drum 11, the peripheral speed will change and the gear 67 will reflect such change in the feed of the strip material to the tire building drum. Suitable side guide plates 68 are adjustably mounted on the brackets 75 to facilitate the movement of the strip material from the centering device to the tire building drum.

Various other modifications are contemplated and may obviously be resorted to by those skilled in the art without departing from the described invention, as hereinafter defined by the appended claims, as only a preferred embodiment thereof has been disclosed.

I claim:

1. A fabric delivering device for servicing a tire building drum comprising a tire building drum, support means, roll supply means mounted on said support means for supplying fabric to said tire building drum, feed means for advancing fabric from said roll supply means to said tire building drum, said feed means including carrier means operative to captively engage and move fabric material to said tire building drum, said carrier means includes a plurality of radially extending needles operative to pierce and engage such fabric material, a centering means located on said support means closely adjacent to said carrier means and operative to center the fabric center with the vertical median plane of said tire building drum prior to delivery of fabric to said carrier means, said centering means having a plurality of opposed rollers operative to contact the laterally spaced side edges of a fabric material passing therethrough, and said opposed rollers increasing in diameter progressively in the direction of feed toward said centering means to define a narrowing of the dimension between said opposed rollers.

2. A fabric delivering device as set forth in claim 1 wherein said rollers are mounted on horizontally disposed shafts defining a pass line for the fabric that is vertically upward to said carrier means.

3. A fabric delivering device as set forth in claim 2, wherein said carrier means includes a sprocket chain that advances said fabric to said tire building drum, said sprocket chain means moves over a small sprocket located closely adjacent to said tire building drum, said small sprocket is mounted on a shaft, a friction roller being keyed to said sprocket shaft for rolling engagement with said tire buidling drum, and said friction roller having the same diameter as said small sprocket to drive said small sprocket at the same peripheral speed as said tire building drum.

4. A fabric delivering device for servicing a tire building drum comprising a tire building drum, support means, roll supply means mounted on said support means for supplying strip material to said tire building drum, strip feeding means mounted on said support means for captively engaging and advancing strip material from said roll supply means to said tire building drum, a centering means mounted on said support means closely adjacent to said strip feeding means and cooperative therewith to align the longitudinal centerline of said strip material with the vertical median plane of said tire building drum, said centering means includes bracket means secured to said support means, a pair of lever members pivotally secured at their intermediate portions to said bracket means, a pair of spaced members having each member pivotally secured to one end portion of one of said lever members, a plurality of guide rollers journaled on each of said members to provide pairs of opposed rollers, each pair of opposed rollers being of increasing diameter in the direction of feed of the fabric to rollingly engage and center the fabric as it is fed therethrough, said opposed rollers define a narrowing passageway therebetween in the direction in which said fabric is fed therethrough, and biasing means connected to said spaced members for biasing said guide rollers toward each other to align the centerline of said strip material with the vertical median plane of said tire building drum as the fabric is fed from said rollers to said strip feeding means.

5. A fabric delivering device as set forth in claim 4, wherein said strip feeding means includes a moving sprocket chain means with needle projections thereon operative to engage the strip material as it is advanced from said centering means for delivery to said tire drum.

6. A fabric delivering device as set forth in claim 4, wherein said strip feeding means includes at least two pairs of sprockets, sprocket chain means interconnecting one sprocket from each of said pairs of sprockets, at least one of said pairs of sprockets mounted adjacent to said centering means, the other of said pair of sprockets mounted adjacent to said tire drum, said needle projections are needles mounted on said sprocket chain, and said sprocket chain is driven at the same speed as the peripheral speed of said tire drum.

* * * * *